US011516174B2

(12) United States Patent
Kaneko et al.

(10) Patent No.: US 11,516,174 B2
(45) Date of Patent: Nov. 29, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Nozomi Kaneko, Nagoya (JP); Aya Onodera, Nagoya (JP); Yuki Tatsumoto, Nagoya (JP); Tsuyoshi Takenami, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/237,725

(22) Filed: Apr. 22, 2021

(65) Prior Publication Data

US 2021/0344637 A1    Nov. 4, 2021

(30) Foreign Application Priority Data

May 1, 2020   (JP) .............................. JP2020-081032

(51) Int. Cl.

| H04L 12/58 | (2006.01) |
| H04L 51/52 | (2022.01) |
| G06Q 50/00 | (2012.01) |
| G06Q 50/30 | (2012.01) |
| G06Q 10/02 | (2012.01) |

(52) U.S. Cl.
CPC ............. *H04L 51/52* (2022.05); *G06Q 10/02* (2013.01); *G06Q 50/01* (2013.01); *G06Q 50/30* (2013.01)

(58) Field of Classification Search
CPC ......... H04L 51/32; H04L 51/02; H04L 67/20; H04L 67/306; H04L 51/52; G06Q 50/01; G06Q 50/30; G06Q 10/02; G06Q 30/0241
See application file for complete search history.

(56) References Cited

U.S. PATENT DOCUMENTS

| 2016/0315901 | A1* | 10/2016 | Clark ................. G06Q 30/0241 |
| 2017/0132540 | A1* | 5/2017 | Haparnas ........... G06Q 10/1093 |
| 2017/0250935 | A1* | 8/2017 | Rosenberg ............. H04L 51/02 |
| 2017/0295114 | A1* | 10/2017 | Goldberg .............. H04L 67/306 |
| 2018/0040020 | A1* | 2/2018 | Kurian ............... G06Q 30/0277 |
| 2018/0182014 | A1* | 6/2018 | Cheng ..................... H04L 51/32 |
| 2019/0068526 | A1* | 2/2019 | Xie ......................... H04L 67/20 |

FOREIGN PATENT DOCUMENTS

JP   2019-067247 A   4/2019

* cited by examiner

*Primary Examiner* — Jungwon Chang
(74) *Attorney, Agent, or Firm* — Sughrue Mion, PLLC (57) ABSTRACT

A controller is provided that is configured to perform: obtaining, among posts of a first user to a social networking service, a first post related to a first service that can be provided to the first user; and transmitting, to the social networking service, information for providing the first service corresponding to the first post to the first user.

12 Claims, 9 Drawing Sheets

| FIRST USER SNS ACCOUNT | MESSAGE | IMAGE | LOCATION | SECOND USER SNS ACCOUNT |
|---|---|---|---|---|
| x x x | A1 | B1 | C1 | x x x |
| x x x | A2 | B2 | C2 | x x x |
| x x x | A3 | B3 | C3 | x x x |
| ... | ... | ... | ... | ... |

Fig. 4

| SECOND USER SNS ACCOUNT | KEYWORD | LOCATION |
|---|---|---|
| x x x | TAXI | D1 |
| x x x | CHILDBIRTH | D2 |
| x x x | FAILURE | D3 |
| . . . | . . . | . . . |

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-081032, filed on May 1, 2020, which is hereby incorporated by reference herein in its entirety.

BACKGROUND

Technical Field

The present disclosure relates to an information processing apparatus, an information processing method, and a non-transitory storage medium storing a program.

Description of the Related Art

There has been known a technique for making a reservation to deliver a vehicle by using a terminal of a user (for example, see Patent Literature 1).

CITATION LIST

Patent Literature

Patent Literature 1: Japanese Patent Application Laid-Open Publication No. 2019-067247

SUMMARY

An object of the present disclosure is to provide a useful service to a user by using a social networking service.

One aspect of the present disclosure is directed to an information processing apparatus including a controller configured to perform: obtaining, among posts of a first user to a social networking service, a first post related to a first service that can be provided to the first user; and transmitting, to the social networking service, information for providing the first service corresponding to the first post to the first user.

Another aspect of the present disclosure is directed to an information processing method for causing a computer to perform: obtaining, among posts of a first user to a social networking service, a first post related to a first service that can be provided to the first user; and transmitting, to the social networking service, information for providing the first service corresponding to the first post to the first user.

A further aspect of the present disclosure is directed to a non-transitory storage medium storing a program configured to cause a computer to perform: obtaining, among posts of the first user to a social networking service, a first post related to a first service that can be provided to the first user; and transmitting, to the social networking service, information for providing the first service corresponding to the first post to the first user.

In addition, a still further aspect of the present disclosure is directed to the program or a system including the information processing apparatus.

According to the present disclosure, it is possible to provide a useful service to a user by using a social networking service.

DESCRIPTION OF THE EMBODIMENTS

A controller included in an information processing apparatus, which is one aspect of the present disclosure, obtains a first post related to a first service that can be provided to a first user, among posts of the first user to a social networking service (SNS). The user's posts include, for example, messages or images. The first service may be provided to the first user by the controller, or may be provided to the first user by a second user who is different from the first user. The first post is, for example, a post indicating that the first user desires to use the first service or a post including a keyword related to the first service.

In addition, the controller transmits, to the social networking service, information for providing the first service corresponding to the first post to the first user. The "information for providing the first service corresponding to the first post to the first user" may be information that is provided to the first user by the controller, or may be information that is provided to the second user by the controller in order for the second user different from the first user to provide the first service to the first user. The information, which is provided to the first user by the controller, is transmitted from the controller to an SNS account of the first user via the social networking service. The information, which is provided to the second user by the controller in order for the second user to provide the first service to the first user, is transmitted from the controller to an SNS account of the second user via the social networking service. In addition, the "information for providing the first service corresponding to the first post to the first user" can include guidance about the first service, information about how to use the first service, or the like. Moreover, the "information for providing the first service corresponding to the first post to the first user" may include information required when the second user provides the first service to the first user (e.g., the SNS account of the first user, or location information of the first user). By providing the first service in response to the posting of the first user in this way, the first user can receive the first service desired by himself/herself without searching for the first service by himself/herself. Further, by providing the first service using the SNS, the first user does not need to separately install software for using the first service.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

Figure 1:
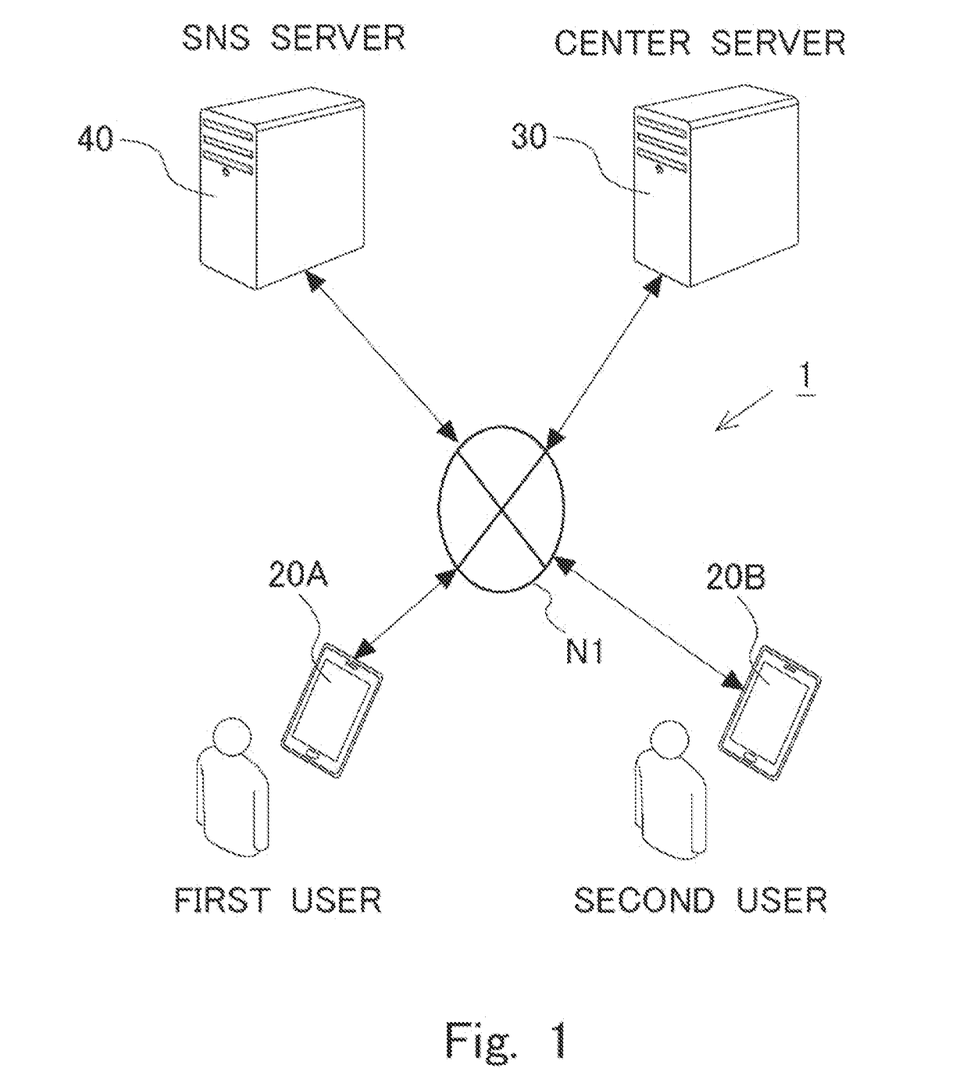
FIG. 1 is a view illustrating a schematic configuration of a system according to an embodiment.

FIG. 1 is a view illustrating a schematic configuration of a system 1 according to a first embodiment. The system 1 is a system that provides a first user with a service corresponding to a message or an image posted to an SNS by the first user.

In the example of FIG. 1, the system 1 includes a first user terminal 20A, a second user terminal 20B, a center server 30, and an SNS server 40. The first user terminal 20A, the second user terminal 20B, the center server 30, and the SNS server 40 are connected to one another by a network N1. The first user terminal 20A is a terminal that is used by the first user, and the second user terminal 20B is a terminal that is used by a second user. The first user is a user who receives a service, and the second user is a user who provides the service to the first user. Hereinafter, in cases where the first user terminal 20A and the second user terminal 20B are not distinguished from each other, they are simply referred to as user terminals 20. Also, in cases where the first user and the second user are not distinguished from each other, the first user and the second user are also simply referred to as users. The users use the SNS, and the user terminals 20 are terminals capable of posting to the SNS and browsing the SNS. Here, note that, for example, the service may be provided to the first user by the second user who is a business operator, or may be provided to the first user by the center server 30 or the SNS server 40.

The network N1 is, for example, a worldwide public communication network such as the Internet, and a WAN (Wide Area Network) or other communication networks may be adopted. In addition, the network N1 may include a telephone communication network such as a mobile phone network, or a wireless communication network such as Wi-Fi (registered trademark). Here, note that in FIG. 1, one first user terminal 20A and one second user terminal 20B are exemplarily illustrated, but there may be a plurality of these user terminals 20.

Figure 2:
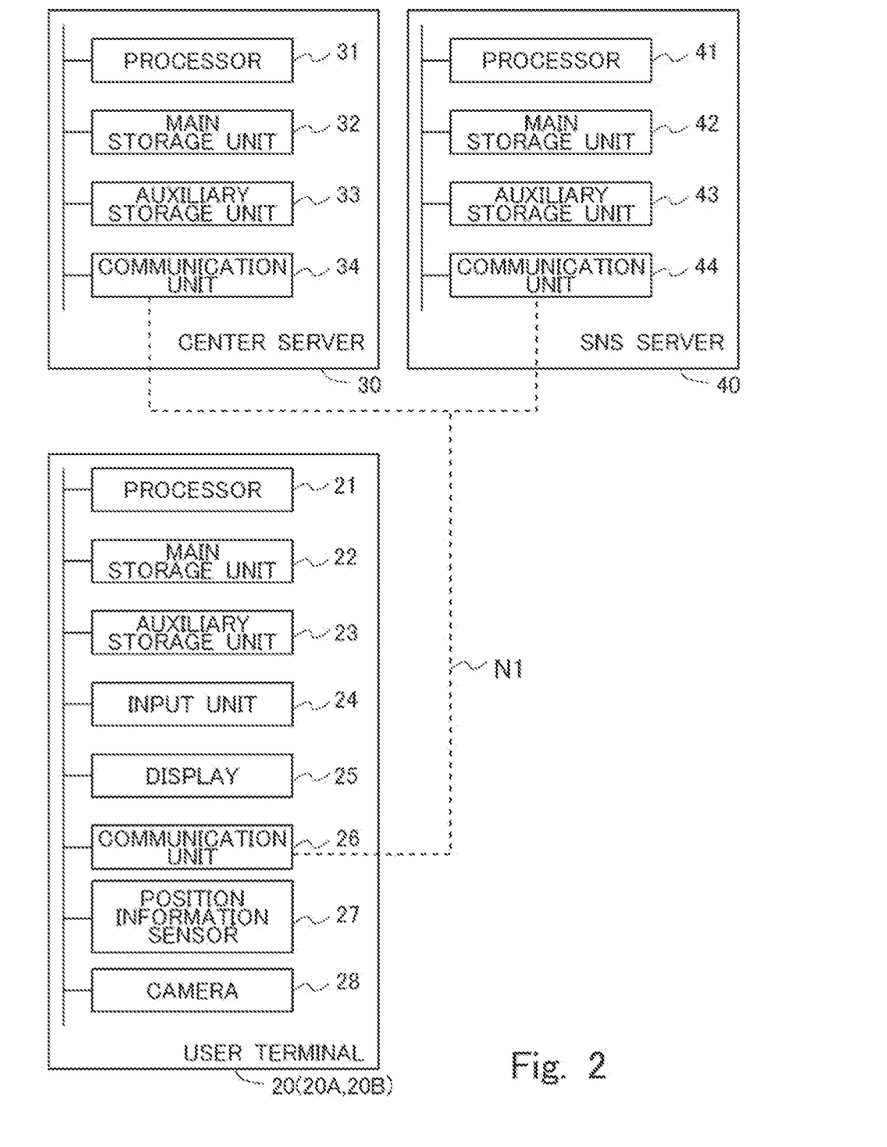
FIG. 2 is a block diagram schematically illustrating an example of a configuration of each of a user terminal, a center server, and an SNS server included in the system according to the embodiment.

The hardware configurations and the functional configurations of the user terminal 20, the center server 30, and the SNS server 40 will be described based on FIG. 2. FIG. 2 is a block diagram schematically illustrating an example of the configuration of each of the user terminal 20, the center server 30 and the SNS server 40, which together constitute the system 1 according to the present embodiment.

The center server 30 has a configuration of a general computer. The center server 30 includes a processor 31, a main storage unit 32, an auxiliary storage unit 33, and a communication unit 34. These components are connected to one another by means of a bus.

The processor 31 is a CPU (Central Processing Unit), a DSP (Digital Signal Processor), or the like. The processor 31 controls the center server 30 thereby to perform various information processing operations. The processor 31 is an example of a controller. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads the programs stored in the auxiliary storage unit 33 into a work area of the main storage unit 32 and executes the programs, so that each of the component units and the like is controlled through the execution of the programs. Thus, the center server 30 realizes functions matching predetermined purposes, respectively. The main storage unit 32 and the auxiliary storage unit 33 are computer-readable recording media. Here, note that the center server 30 may be a single computer or a combination of a plurality of computers. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the user terminal 20 and the SNS server 40 via the network N1. The communication unit 34 is, for example, a LAN (Local Area Network) interface board, a wireless communication circuit for radio or wireless communication, or the like. The LAN interface board or the wireless communication circuit is connected to the network N1.

Here, note that a series of processing performed by the center sever 30 can be performed by hardware, but can also be performed by software.

Now, the SNS server 40 has a configuration of a general computer. The SNS server 40 includes a processor 41, a main storage unit 42, an auxiliary storage unit 43, and a communication unit 44. These components are connected to one another by means of a bus. The processor 41, the main storage unit 42, the auxiliary storage unit 43, and the communication unit 44 are the same as the processor 31, the main storage unit 32, the auxiliary storage unit 33, and the communication unit 34 of the center server 30, respectively, and hence, the description thereof will be omitted.

Next, the user terminal 20 will be described. The user terminal 20 is, for example, a smart phone, a mobile phone, a tablet terminal, a personal information terminal, a wearable computer (a smart watch or the like), or a small computer such as a personal computer (PC). The user terminal 20 includes a processor 21, a main storage unit 22, an auxiliary storage unit 23, an input unit 24, a display 25, a communication unit 26, a position information sensor 27, and a camera 28. These components are connected to one another by means of a bus. The processor 21, the main storage unit 22 and the auxiliary storage unit 23 are the same as the processor 31, the main storage unit 32 and the auxiliary storage unit 33 of the center server 30, respectively, and hence, the description thereof will be omitted.

The input unit 24 is a means or unit for receiving an input operation performed by a user, and is, for example, a touch panel, a mouse, a keyboard, a push button, or the like. The display 25 is a means or unit for presenting information to the user, and is, for example, an LCD (Liquid Crystal Display), an EL (Electroluminescence) panel, or the like. The input unit 24 and the display 25 may be configured as a single touch panel display. The communication unit 26 is a communication means or unit for connecting the user terminal 20 to the network N1. The communication unit 26 is a circuit for communicating with other devices (e.g., the center server 30, the SNS server 40, or the like) via the network N1 by making use of a mobile communication service (e.g., a telephone communication network such as 5G (5th Generation), 4G (4th Generation), 3G (3rd Generation), or LTE (Long Term Evolution)) or a wireless communication network such as Wi-Fi (registered trademark), Bluetooth (registered trademark) or the like.

The position information sensor 27 obtains position information (e.g., latitude and longitude) of the user terminal 20. The position information sensor 27 is, for example, a GPS (Global Positioning System) receiver unit, a wireless LAN communication unit, or the like. The camera 28 takes or photographs images by using an imaging element such as for example a CCD (Charge Coupled Device) image sensor, a CMOS (Complementary Metal Oxide Semiconductor) image sensor or the like. The images obtained by the photographing may be either still images or moving images.

Figure 3:
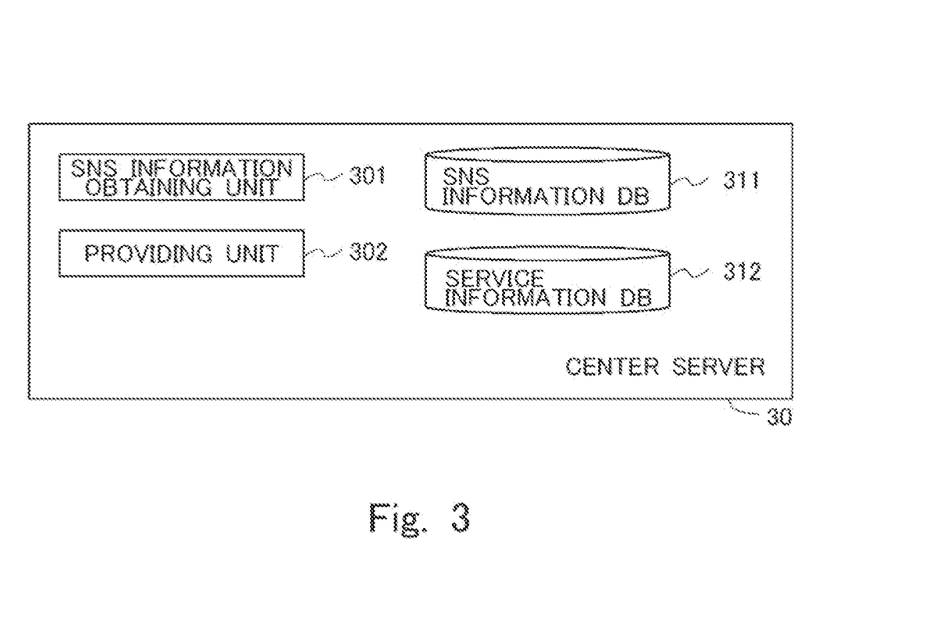
FIG. 3 is a diagram illustrating a functional configuration of the center server.

Now, the function of the center server 30 will be described. FIG. 3 is a view illustrating an example of a functional configuration of the center server 30. The center server 30 includes, as its functional components, an SNS information obtaining unit 301, a providing unit 302, an SNS information DB 311, and a second user information DB 312. The processor 31 of the center server 30 performs the processing of the SNS information obtaining unit 301 and the providing unit 302 by executing a computer program on the main storage unit 32. However, any of each functional component or a part of the processing thereof may be performed by a hardware circuit.

The SNS information DB 311 and the second user information DB 312 are constructed by a program of a database management system (DBMS) that is executed by the processor 31 to manage data stored in the auxiliary storage unit 33. The SNS information DB 311 and the second user information DB 312 are, for example, relational databases.

Here, note that any of the individual functional component elements of the center server 30 or a part of the processing thereof may be performed by other computers connected to the network N1.

The SNS information obtaining unit 301 obtains SNS information from the SNS server 40. The SNS information referred to herein is information about posts to the SNS made by the first user, and includes, for example, messages and images. In addition, position information associated with the posts may be further included in the SNS information. Here, note that the SNS information obtained by the SNS information obtaining unit 301 may be limited to information about posts including predetermined keywords. A post including the predetermined keywords is an example of a first post. The predetermined keywords may have been determined in advance for each service to be provided. The SNS information obtaining unit 301 stores the obtained SNS information in the SNS information DB 311 which will be described later.

The providing unit 302 transmits, to the SNS server 40, information for providing a service corresponding to a post of the first user to the first user. The information to be transmitted to the SNS server 40 may be transmitted from the SNS server 40 to an SNS account of the first user, or may be transmitted from the SNS server 40 to an SNS account of the second user. In cases where the information transmitted to the SNS server 40 is information transmitted from the SNS server 40 to the SNS account of the first user, a service is provided from the center server 30 to the first user via the SNS server 40. On the other hand, in cases where the information transmitted to the SNS server 40 is information transmitted to the SNS account of the second user, a service is provided from the second user to the first user. The providing unit 302 may generate information to be transmitted to the SNS account of the first user or the SNS account of the second user according to each service.

For example, the providing unit 302 extracts a keyword related to a service from the SNS information, and generates information about the service corresponding to the keyword. The relation between the keyword and the service may have been stored in the second user information DB 312 in advance. Here, note that the service for which the information is provided may be limited to the service provided by the second user whom the first user is following on the SNS.

For example, when the first user posts a message for the use of a taxi, "taxi" is extracted as a keyword related to a service. Then, the providing unit 302 generates, as information about a service corresponding to the keyword, information about a taxi company followed by the first user. The taxi company corresponds to the second user. The information thus generated may include, for example, an inquiry about whether or not to request the taxi company to deliver a taxi or a proposal to request the taxi company to deliver a taxi. In cases where the inquiry or the proposal is transmitted to the SNS account of the first user and the first user responds to the effect that the delivery of a taxi is desired through the SNS, the providing unit 302 may generate information for requesting the delivery of a taxi (e.g., the position, the destination, the name, the SNS account or the like of the first user) to the account of the taxi company, and transmit the information to the SNS account of the taxi company. Note that in cases where the departure place and the destination of the first user are known in advance, the taxi company may notify the first user of the travel time and the fare by the taxi via the SNS. For example, the departure place and the destination of the first user may be obtained from the first user through the above inquiry, or the departure place and the destination entered into the first user terminal 20A by the first user at the time when the first user performs a route search may be obtained from the first user terminal 20A. In addition, the current location of the first user may be set as the departure place of the first user. Examples of keywords related to the use of a taxi include "taxi", "want to use a taxi", "want to take a taxi", "want to go on a taxi", etc.

In addition, for example, when the first user posts a message about a failure of a vehicle, "vehicle failed" is extracted, for example, as a keyword related to a service. Then, the providing unit 302 generates, as information about the service corresponding to the keyword, information about an automobile dealer or automobile repair shop that the first user is following. Here, as an alternative, in cases where the messages posted by the first user include a message and an image related to the failure of the vehicle, the providing unit 302 generates information about an automobile dealer or an automobile repair shop followed by the first user. The automobile dealer or the automobile repair shop corresponds to the second user. The information to be generated includes an inquiry about whether or not to request advice about the failure or an inquiry about whether or not to request repair of the vehicle to the automobile dealer or the automobile repair shop, or includes a proposal for the failure. The providing unit 302 transmits this inquiry or proposal to the SNS account of the first user. Then, for example, when the first user responds via the SNS to the effect that advice about the failure is requested, the providing unit 302 generates a message requesting advice on the location of the failure and transmits the message together with an image thereof to the SNS account of the automobile dealer or the automobile repair shop followed by the first user. Upon receiving advice from the automobile dealer or the automobile repair shop via the SNS, the providing unit 302 transmits the advice to the SNS account of the first user via the SNS. Note that the advice may be transmitted from the account of the automobile dealer or the automobile repair shop to the account of the first user via the SNS. That is, the advice may be provided to the first user without going through the center server 30.

Moreover, in cases where the advice indicates that the vehicle needs to be repaired immediately, the providing unit 302 may transmit information indicating the location of the automobile dealer or the automobile repair shop to the SNS account of the first user, or may transmit information about a route to the location of the automobile dealer or the automobile repair shop. In this case, too, the information may be transmitted from the automobile dealer or the automobile repair shop to the first user via the SNS without passing through the center server 30. In addition, in cases where it is determined at the automobile dealer or the automobile repair shop that the vehicle cannot travel, the providing unit 302 may arrange a tow truck for the first user, as in the case of the delivery of a taxi as described above. Messages about the failure of the vehicle can include, as examples, "the vehicle has failed", "the vehicle does not move", "the vehicle has broken", "something is wrong with the vehicle", or the like.

Further, for example, in cases where the first user posts a message and an image about a warning light, which is turned on in a meter panel of the vehicle, "warning light is turned on" is extracted, for example, as a keyword related to a service. Then, the providing unit 302 generates, as the information about the service corresponding to the keyword, information about the automobile dealer or the automobile repair shop followed by the first user. Here, note that the meter panel of the vehicle is an example of a display unit of the vehicle. The automobile dealer or the automobile repair shop corresponds to the second user. The information to be generated includes an inquiry about whether or not to request advice about the warning light or an inquiry about whether or not to request repair of the vehicle to the automobile dealer or the automobile repair shop. The providing unit 302 transmits this inquiry to the SNS account of the first user. Then, for example, when the first user responds via the SNS to the effect that advice on the warning light that is on is requested, the providing unit 302 generates a message requesting advice on the warning light and transmits the message together with an image thereof to the SNS account of the automobile dealer or the automobile repair shop that the first user is following. Upon receiving the advice from the automobile dealer or the automobile repair shop via the SNS, the providing unit 302 transmits the advice to the SNS account of the first user via the SNS. Here, note that the advice may be transmitted from the account of the automobile dealer or the automobile repair shop to the account of the first user via the SNS. That is, the advice may be provided to the first user without passing through the center server 30.

In addition, in cases where the advice indicates that the vehicle needs to be repaired immediately, the providing unit 302 may transmit information indicating the location of the automobile dealer or the automobile repair shop to the SNS account of the first user, or may transmit information about a route to the location of the automobile dealer or the automobile repair shop. In this case, too, the information may be transmitted from the automobile dealer or the automobile repair shop to the first user via the SNS without passing through the center server 30. Also, in cases where it is determined at the automobile dealer or the automobile repair shop that the vehicle cannot travel, the providing unit 302 may arrange a tow truck for the first user, as in the case of the delivery of a taxi as described above. Messages about the warning light being turned on in the meter panel of the vehicle can include, as examples, "a warning light is turned on", "the light of a meter is turned on", and "a warning is issued".

Moreover, the providing unit 302 may analyze the image contained in the post about the warning light being turned on in the vehicle or the image contained in the post about the failure of the vehicle, and generate a message to be transmitted to the first user according to the result of the image analysis. For example, a message may be generated to inform the first user of the meaning of the warning light being turned on in the meter panel and a countermeasure therefor. Also, for example, a message may be generated so as to teach the first user about the description of a failed component and a countermeasure therefor. In addition, in cases where it is determined from the result of the image analysis that the first user cannot cope with the situation by himself/herself, it may be proposed that the first user goes to an automobile dealer or automobile repair shop. At this time, a route to the automobile dealer or the automobile repair shop near the current location of the first user may be guided. Further, in cases where it is determined that repair is necessary, a repair estimate may be generated and sent to the SNS account of the first user. The repair fee corresponding to the failure location may have been stored in advance in the auxiliary storage unit 33 of the center server 30, or may be inquired of the automobile dealer or the automobile repair shop.

Further, for example, when the first user posts a message for the use of car share or ride share, for example, "want to use car share" is extracted as a keyword related to a service. Then, the providing unit 302 generates, as information about a service corresponding to the keyword, information about an operating company for car share or ride share followed by the first user. The operating company for car share or ride share corresponds to the second user. The information to be generated includes, for example, an inquiry as to whether or not to request the car-sharing or ride-sharing operating company to arrange for a vehicle. The providing unit 302 transmits the inquiry to the SNS account of the first user. Then, when the first user responds via the SNS to the effect that he or she wants to arrange for a vehicle, the providing unit 302 generates information for requesting a vehicle arrangement (e.g., the SNS account of the user, the period of use, etc.), and transmits the information to the SNS account of the car-sharing or ride-sharing operating company followed by the first user. Note that a fee for using the service may be notified to the first user from the car-sharing or ride-sharing operating company via the SNS. Keywords for the use of car share or ride share wanted by the first user can include, as examples, "car share", "ride share", "want to take a shared car", "want to rent a car", "want to use a shared car", etc.

Furthermore, for example, when the first user posts a message about childbirth, for example, "child born" is extracted as a keyword related to a service. Then, the providing unit 302 generates information about the purchase of a family car or the purchase of a house as a service corresponding to the keyword. In other words, information is generated in such a way as to propose the purchase of things that correspond to the increase in the number of children. In this case, the relevant products from sellers of family cars or houses may have been registered with the center server 30 in advance. The providing unit 302 transmits the information thus generated to the SNS account of the first user via the SNS. Then, for example, when the first user responds via the SNS to the effect that he or she is considering the purchase of a family car or a house, the providing unit 302 generates a message about the purchase of a family car or a house, and transmits the message to the SNS account of an automobile dealer or a real estate agent. Upon receiving the message from the automobile dealer or the real estate agent via the SNS, the providing unit 302 transmits the message to the SNS account of the first user via the SNS. Here, note that the message from the automobile dealer or the real estate agent may be transmitted from the account of the automobile dealer or the real estate agent to the account of the first user via the SNS. That is, the message may be provided to the first user without passing through the center server 30. Keywords related to childbirth can include, as examples, "born", "childbirth", "increased children", or the like.

In addition, for example, when the first user posts a message about the suspension of transportation (e.g., trains) or the delay of trains, "trains are delayed" is extracted, for example, as a keyword related to a service. Then, the providing unit 302 generates information about alternative transportation as information about a service corresponding to the keyword. For example, information about a request for presentation of alternative transportation is generated and transmitted to an SNS account of a business operator that provides transfer guidance. This business operator corresponds to the second user. This request includes, for example, the SNS account of the first user, the current location of the first user, and the destination thereof. The alternative transportation is searched for at the second user terminal 20B that has received the request, and a search result is transmitted from the SNS account of the second user to the SNS account of the first user. Here, note that the second user may generate transfer guide based on the alternative transportation, and transmit the transfer guide to the SNS account of the first user. Further, the providing unit 302 may transmit an inquiry as to whether or not to request a proposal of the alternative transportation to the SNS account of the first user, and transmit information about a request for the presentation of the alternative transportation to the SNS account of the business operator only when the first user responds to the effect that the proposal of the alternative transportation is requested. Keywords related to the suspension or delay of trains can includes, as examples, "trains are delayed", "trains are suspended", or the like.

Figure 4:
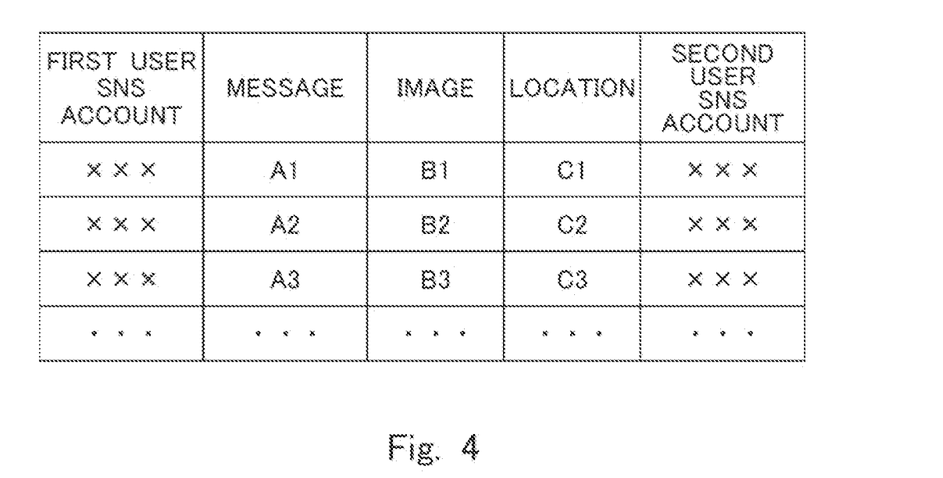
FIG. 4 is a diagram illustrating a table configuration of SNS information.

Next, the configuration of the SNS information stored in the SNS information DB 311 will be described based on FIG. 4. FIG. 4 is a diagram illustrating a table configuration of the SNS information. The SNS information table includes fields of first user SNS account, message, image, location, and second user SNS account. The SNS accounts of first users who have transmitted posts to the SNS server 40 are entered in the first user SNS account field. The messages contained in the posts of the first users are entered in the message field. The images contained in the posts of the first users are entered in the image field. The information (e.g., coordinates or addresses) about the locations where the first users have posted are entered in the location field. The SNS accounts of second users followed by the first users are entered in the second user SNS account field. The SNS information is provided from the SNS server 40. The SNS server 40 obtains SNS information from first user terminals 20A. Here, note that the SNS information DB 311 may store only the information corresponding to messages including predetermined keywords related to services to be provided to the first users.

Figure 5:
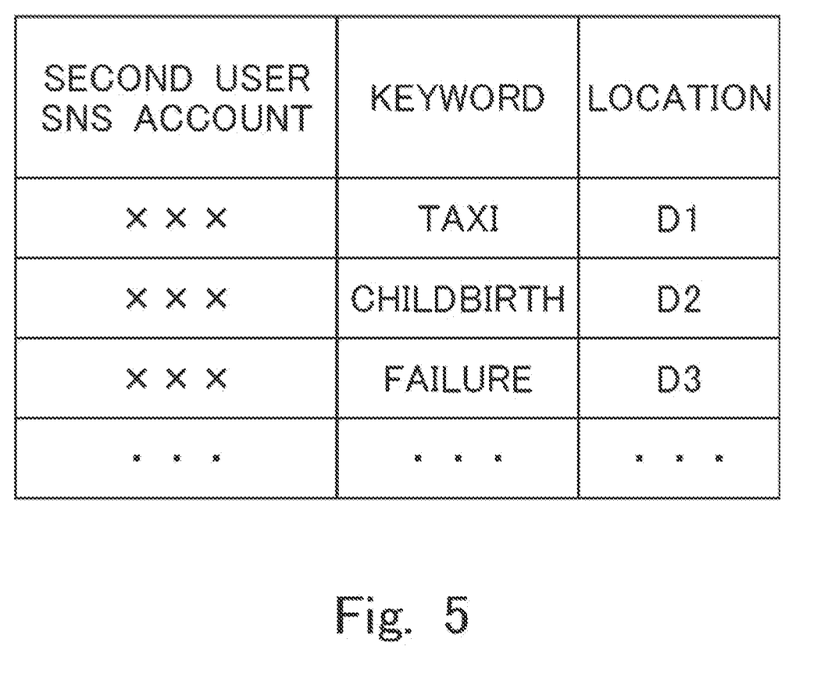
FIG. 5 is a diagram illustrating an example of a table configuration of a second user information DB.

Then, the second user information DB 312 will be described. The second user information DB 312 stores information (hereinafter also referred to as second user information) about business operators (second users) such as a taxi company, an automobile dealer, an automobile repair shop, etc., which provide services to the first users. The second user information may be registered in advance in the center server 30 by the second users using their second user terminals 20B, or may be generated based on the SNS information by the center server 30. The configuration of the second user information stored in the second user information DB 312 will be described based on FIG. 5. FIG. 5 is a diagram illustrating a table configuration of the second user information DB 312. The second user information table includes fields of second user SNS account, keyword, and location. The SNS accounts associated with the second users, respectively, are entered in the second user SNS account field. The keywords related to the services that can be supported by the second users, respectively, are entered in the keyword field. Here, note that the keywords corresponding to the second users may be determined by the second users, respectively, or may be determined by the center server 30 according to the business types of the second users, respectively. Information (e.g., coordinates or address) about the locations of the second users are entered in the location field. The location of a second user may be entered as, for example, a location where a service is provided to a first user.

Figure 6:
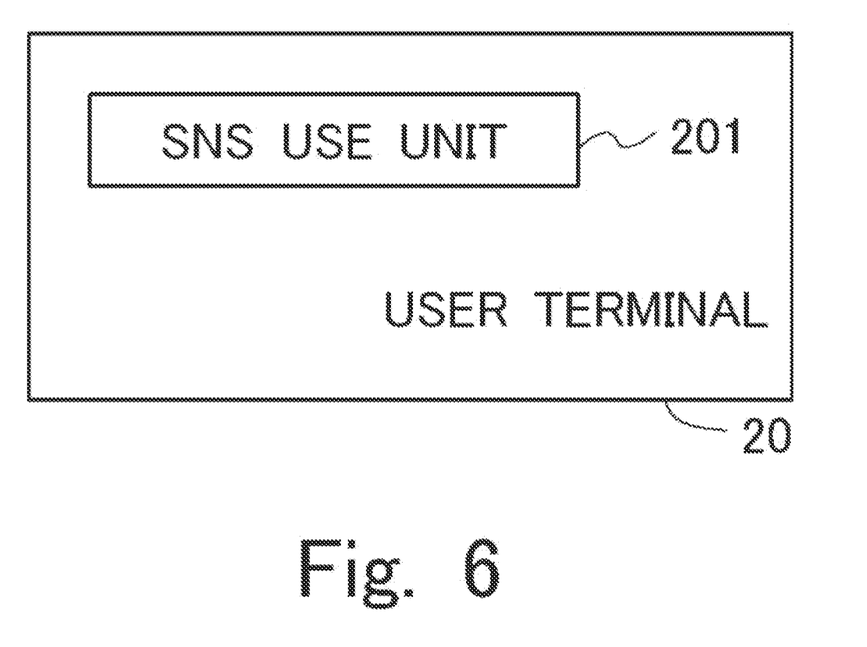
FIG. 6 is a diagram illustrating a functional configuration of the user terminal.

Next, the function of each user terminal 20 will be described. FIG. 6 is a diagram illustrating a functional configuration of the user terminal 20. The user terminal 20 includes an SNS use unit 201 as its functional component. The processor 21 of the user terminal 20 executes the processing of the SNS use unit 201 by a computer program on the main storage unit 22.

The SNS use unit 201 displays an operation screen on the display 25, and transmits information corresponding to an input to the input unit 24 by a user to the SNS server 40. For example, the SNS use unit 201 displays the operation screen for the SNS or the like on the touch panel display, and, when the user makes some input on the operation screen or the like, it transmits information corresponding to the input to the SNS server 40. In addition, in the SNS use unit 201, the user can also post an image captured by the camera 28. Also, the SNS use unit 201 displays information provided from the SNS server 40 on the display 25, so that the user can browse the SNS.

In addition, when a first user receives a service corresponding to posting to the SNS, the SNS use unit 201 receives information about the service from the SNS server 40, and displays the received information on the display 25. Also, when an inquiry about whether or not to receive a service from the center server 30 is received via the SNS, the inquiry is displayed on the display 25, and a message prompting the first user to enter a response is displayed on the display 25. When the first user enters a response into the input unit 24, the SNS use unit 201 transmits information corresponding to the response to the center server 30 via the SNS.

Moreover, in the case where the user of a user terminal 20 is a second user, for example, when a request to provide a service to the first user is received from the center server 30 via the SNS, the SNS use unit 201 displays the request on the display 25, and displays a message prompting the second user to make an input related to the service on the display 25. When the second user enters information about the service into the input unit 24, the SNS use unit 201 transmits the information to the SNS account of the first user via the SNS.

Next, the SNS server 40 will be described. The SNS server 40 is a server that manages the SNS. The SNS server 40 manages users' SNS postings and other information. The SNS server 40 can communicate with the user terminals 20 and the center server 30 via the network N1. The SNS server 40 stores messages and images posted by each user in the auxiliary storage unit 43. The SNS server 40 provides information about the SNS based on requests from the user terminals 20 and the center server 30.

Figure 7:
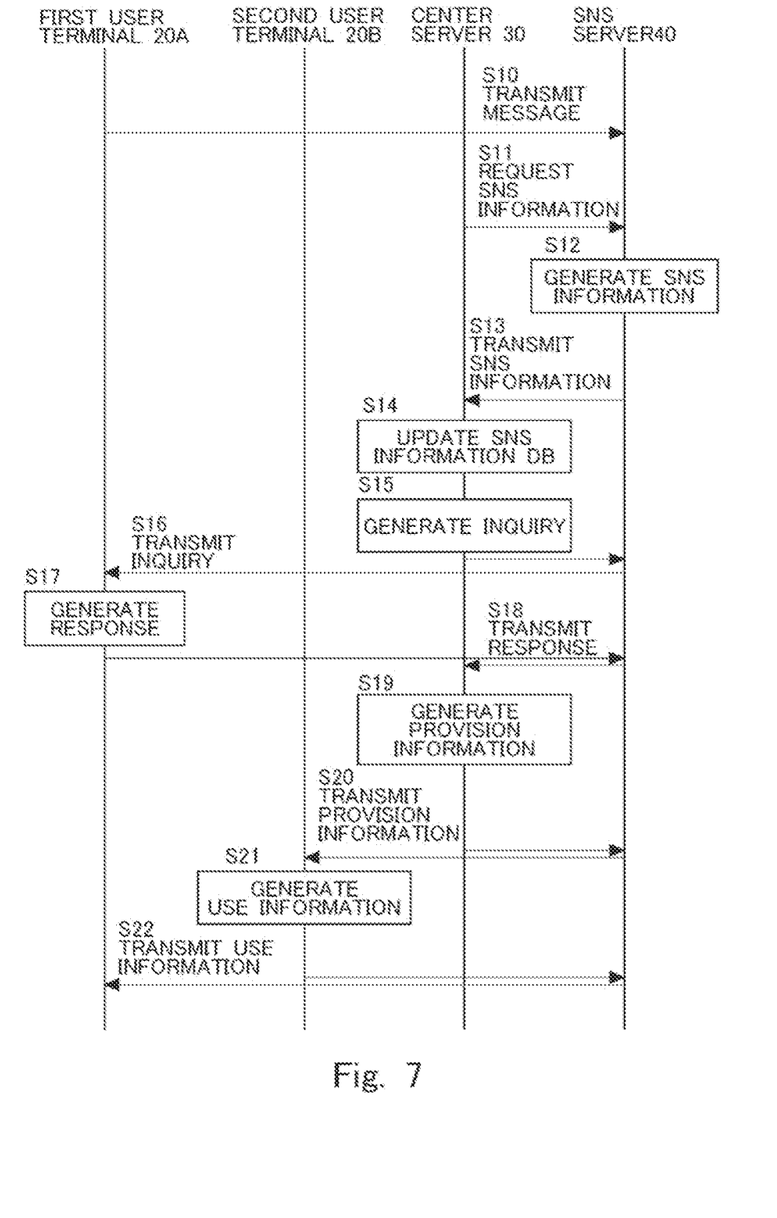
FIG. 7 is a sequence diagram of processing of the system.

Then, the processing of the entire system 1 will be described. FIG. 7 is a sequence diagram of the processing of the system 1. Here, note that the following explanation will be made on the assumption that the second user information has already been stored in the second user information DB 312. When a first user posts a message to the SNS at a first user terminal 20A, the message is transmitted to the SNS server 40 (S10). The SNS server 40 stores the received message in the SNS information DB 311. On the other hand, the center server 30 requests the SNS server 40 to provide SNS information, for example, at predetermined time intervals (S11). When there is a request from the center server 30 to provide SNS information, the SNS server 40 generates the SNS information (S12), and transmits it to the center server 30 (S13).

After receiving the SNS information, the center server 30 updates the SNS information DB 311 (S14). Also, the center server 30 extracts a keyword from the SNS information. Then, the center server 30 generates an inquiry as to whether or not a service corresponding to the keyword needs to be provided (S15), and transmits the inquiry to the first user terminal 20A via the SNS server 40 (S16). This inquiry is made on the SNS. Instead of the inquiry on the SNS, the inquiry may be directly transmitted from the center server 30 to the first user terminal 20A by using, for example, an electronic mail or the like without passing through the SNS server 40. In the first user terminal 20A, a response is generated according to an input of the first user (S17). The response thus generated is transmitted from the first user terminal 20A to the center server 30 via the SNS server 40 (S18). This response may also be made on the SNS, or may be directly transmitted from the first user terminal 20A to the center server 30 by using, for example, an electronic mail or the like.

Here, note that the transmission of an inquiry from the center server 30 to the first user terminal 20A is not essential. For example, the processing from S15 to S18 can be omitted. In this case, when a keyword related to a service is included in the SNS information, the processing or routine proceeds to the processing of S19 after the processing of S14.

In cases where the response from the first user terminal 20A is to use the service, the center server 30 generates provision information that is information for requesting a corresponding second user to provide the service (S19). The corresponding second user is a second user corresponding to the keyword extracted from the SNS information, and is selected based on the extracted keyword and the information stored in the second user information DB 312. The provision information is information for requesting the second user to provide the service to the first user, and includes information necessary for the second user to provide the service to the first user. Then, the provision information is transmitted from the center server 30 to a corresponding second user terminal 20B via the SNS server 40 (S20). The transmission of the provision information may be performed on the SNS, or may be directly performed from the center server 30 to the second user terminal 20B by using, for example, an electronic mail or the like without passing through the SNS server 40.

In the second user terminal 20B, information about the service to be provided to the first user (hereinafter, referred to as use information) is generated in response to an input of the second user (S21). The use information is information to be transmitted to the first user terminal 20A when the service is provided to the first user. For example, when the second user is a taxi company, a taxi is delivered, and information about a taxi fare and a travel time is generated as the use information. In addition, for example, in cases where the second user is an automobile dealer or an automobile repair shop, advice about a failure of the vehicle of the first user or a warning light being turned on is generated as the use information. Then, the use information is transmitted from the second user terminal 20B to the first user terminal 20A via the SNS server 40 (S22). The transmission of the use information may be performed on the SNS, or may be directly performed from the second user terminal 20B to the first user terminal 20A by using, for example, an electronic mail or the like without passing through the SNS server 40. Further, for example, the use information may be transmitted from the second user terminal 20B to the center server 30, and further transmitted from the center server 30 to the first user terminal 20A. In this case, too, the use information may be transmitted via the SNS server 40, or the use information may be transmitted without passing through the SNS server 40.

Figure 8:
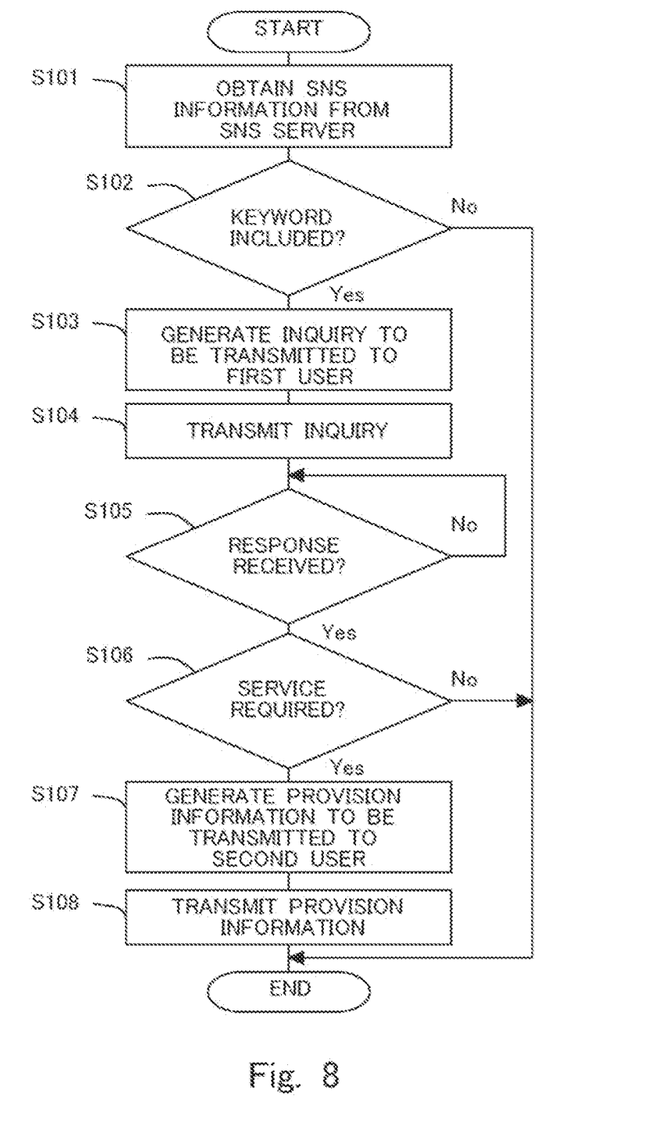
FIG. 8 is a flowchart of provision processing according to the embodiment.

Next, provision processing, which is the processing of providing a service to the first user, will be explained. FIG. 8 is a flowchart of the provision processing according to the present embodiment. The provision processing illustrated in FIG. 8 is repeatedly performed in the center server 30 at predetermined time intervals for each of the SNS accounts of the first users. Here, note that the provision processing may be performed for the first users who have agreed to receive the services of this system or for the SNS accounts of the first users who have requested to receive the services of this system.

In step S101, the SNS information obtaining unit 301 obtains SNS information from the SNS server 40. The SNS information obtaining unit 301 accesses the SNS server 40 and obtains the SNS information that includes messages, images and locations corresponding to a first user, and an SNS account of a second user who is followed by the first user. The SNS information is associated with the SNS account of the first user. Here, note that the SNS information may be obtained by using a search function of the SNS server 40 or a search function of the center server 30. The SNS information obtaining unit 301 updates the SNS information DB 311 by storing the SNS information thus obtained into the SNS information DB 311.

In step S102, the providing unit 302 determines whether predetermined keywords are included in the message obtained by the SNS information obtaining unit 301. The predetermined keywords are the keywords stored in the second user information DB 312, and are also keywords related to a service (first service) provided by the second user whom the first user is following. Here, note that, as an alternative, it may also be determined whether or not keywords stored in the second user information DB 312 are included in the message, regardless of whether the first user is following the second user. The message that is determined to include keywords in step S102 is an example of a first post. When an affirmative determination is made in step S102, the processing proceeds to step S103, whereas when a negative determination is made, this routine is ended.

In step S103, the providing unit 302 generates an inquiry to the first user to confirm whether to use a service. The inquiry includes, for example, information for inquiring whether or not to use the service provided by the second user corresponding to the predetermined keywords. For example, in cases where a keyword related to the use of a taxi is included in the predetermined keywords, an inquiry is generated to confirm whether or not it is acceptable to request the delivery of a taxi to a taxi company. In addition, for example, in cases where a keyword related to a vehicle failure is included in the predetermined keywords and images are contained in the post, an inquiry is generated to confirm whether or not advice on how to deal with the failure is needed. Then, in step S104, the providing unit 302 transmits the inquiry thus generated to the SNS account of the first user. At this time, for example, the inquiry is sent on the SNS via the SNS server 40.

In step S105, the providing unit 302 determines whether or not a response has been received from the SNS account of the first user. When an affirmative determination is made in step S303, the processing proceeds to step S106, whereas when a negative determination is made, the processing of step S105 is performed again. In step S106, the providing unit 302 determines whether or not the response of the first user received from the SNS account of the first user is a response to the effect that the provision of a service is necessary. When an affirmative determination is made in step S106, the processing proceeds to step S107, whereas when a negative determination is made, this routine is ended.

In step S107, the providing unit 302 generates information (provision information) for requesting the second user to provide a service. The providing unit 302 generates the provision information so that the second user provides the service to the first user. For example, in cases where the first user needs to use a taxi, information including the location of the first user and the SNS account of the first user is generated so that a taxi company can deliver the taxi. In addition, for example, in cases where the first user needs advice on the location of a failure in the vehicle, information including a message about the vehicle failure of the first user, an image, and the SNS account of the first user is generated so that the automobile dealer or the automobile repair shop can give advice to the first user. Then, in step S108, the providing unit 302 transmits the provision information generated in step S107 to the SNS account of the second user.

Figure 9:
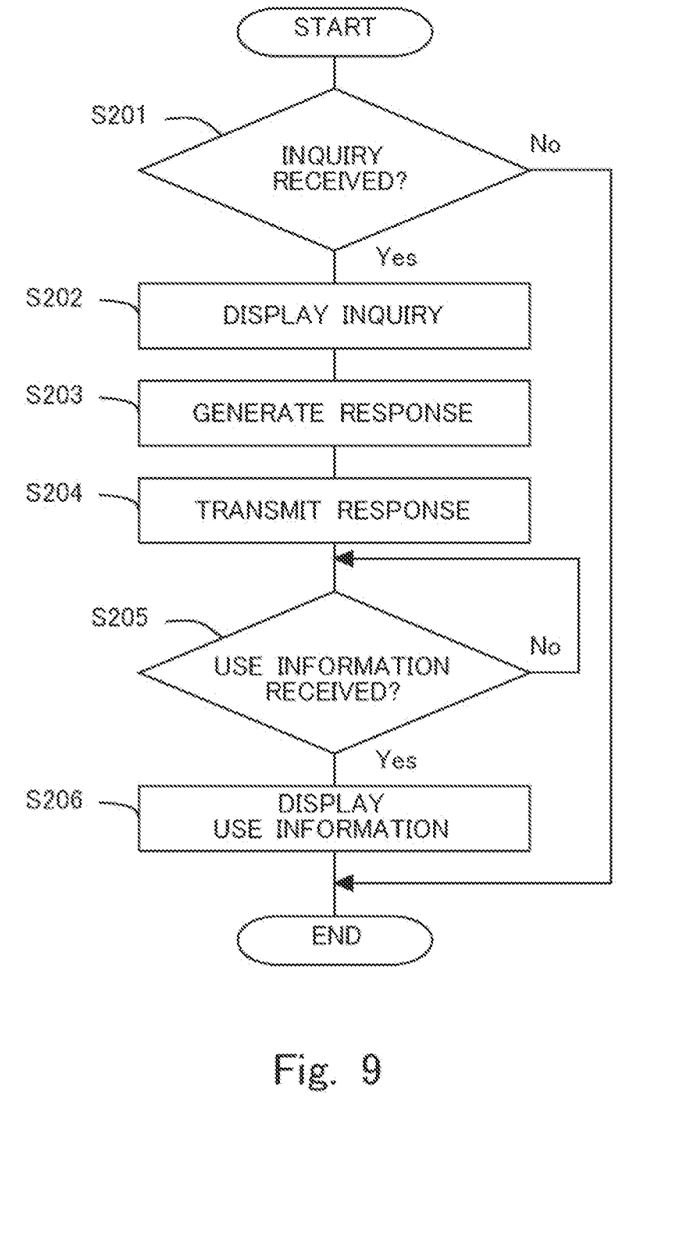
FIG. 9 is a flowchart of processing in which a first user receives a service according to the embodiment.

Now, the processing in which the first user receives a service will be described. FIG. 9 is a flowchart of the processing in which the first user receives a service according to the present embodiment. The processing illustrated in FIG. 9 is repeatedly performed in the first user terminal 20A at predetermined time intervals.

In step S201, the SNS use unit 201 determines whether or not an inquiry has been received from the center server 30 via the SNS. When an affirmative determination is made in step S201, the processing proceeds to step S202, whereas when a negative determination is made, this routine is ended. In step S202, the SNS use unit 201 displays information about the inquiry on the display 25. The SNS use unit 201 displays, for example, information for responding to whether or not to request the provision of a service. For example, the SNS use unit 201 displays the words "use a service" and "do not use a service" and radio buttons on the display 25. Then, in step S203, the SNS use unit 201 generates a response based on a radio button tapped by the first user. Further, in step S204, the SNS use unit 201 transmits the response thus generated to the center server 30. At this time, for example, the response is transmitted on the SNS via the SNS server 40.

Then, in step S205, the SNS use unit 201 determines whether or not use information has been received from the SNS account of the second user. For example, in the case of using a taxi, it is determined whether or not information about a fare for use or a required time has been received. This information is received from a taxi company as the second user via the SNS server 40. When an affirmative determination is made in step S205, the processing proceeds to step S206, whereas when a negative determination is made, the processing of step S205 is performed again. Then, in step S206, the SNS use unit 201 displays the received use information on the display 25. The display 25 shows, for example, information indicating that the delivery of the taxi has been completed and guidance on the fare for use. In addition, for example, advice about the failure of the vehicle or the warning light being turned on in the meter panel of the vehicle is displayed. Also, for example, guidance on alternative transportation is displayed. Moreover, for example, a catalog of family cars or houses is displayed. Further, for example, fares of car sharing or ride sharing are displayed.

As described above, according to the present embodiment, the service required by the first user is provided based on the message and the image posted by the first user on the SNS. This allows the first user to obtain desired information without having to search for it by himself/herself. Also, since the service is provided through the SNS that the user usually uses, there is no need for the first user to register separately or install any new software.

Other Embodiments

The above-described embodiment is merely an example, but the present disclosure can be implemented with appropriate modifications without departing from the spirit thereof.

The processing and means (devices, units, etc.) described in the present disclosure can be freely combined and implemented as long as no technical contradiction occurs.

In addition, the processing described as being performed by a single device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system. For example, the center server 30 may include a part or all of the functions of the SNS server 40. Also, for example, the SNS server 40 may include a part or all of the functions of the center server 30. The center server 30 and the SNS server 40 may be a single server.

The operator of the center server 30 may obtain compensation from a first user or a second user. In addition, when a first user posts an evaluation of a service to an SNS after receiving the service from a second user, the providing unit 302 of the center server 30 may provide an incentive to the first user terminal 20A of the first user. The incentive is provided, for example, by sending information about electronic money, a discount coupon, a gift certificate or the like to the first user terminal 20A. Moreover, an incentive that the first user has registered in advance in the center server 30 by using the first user terminal 20A or an incentive that the second user has registered in advance in the center server 30 by using the second user terminal 20B may be provided to the first user.

Figure 10:
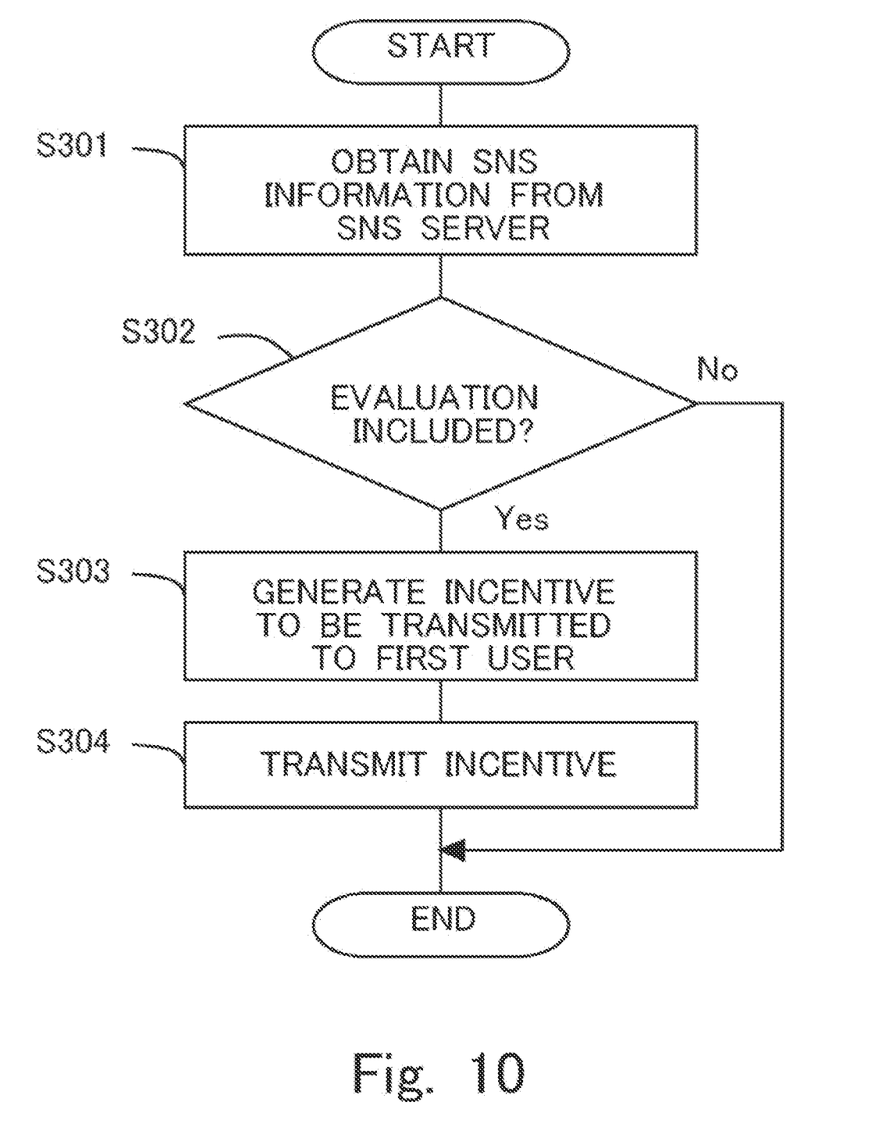
FIG. 10 is a flowchart of processing in which the center server provides an incentive to the first user.

FIG. 10 is a flowchart of processing in which the center server 30 provides an incentive to a first user. The processing illustrated in FIG. 10 is repeatedly performed in the center server 30 at predetermined time intervals. In step S301, the SNS information obtaining unit 301 obtains SNS information from the SNS server 40. In step S302, the providing unit 302 determines whether or not an evaluation of the second user is included in a message obtained by the SNS information obtaining unit 301. Here, for example, in cases where a keyword corresponding to an evaluation is included, it is determined that an evaluation of the second user is included. When an affirmative determination is made in step S302, the processing proceeds to step S303, whereas when a negative determination is made, this routine is ended.

In step S303, the providing unit 302 generates information about an incentive to be provided to the first user. Then, in step S304, the providing unit 302 transmits information about the incentive thus generated to the SNS account of the first user, thereby providing the first user with the incentive. In this way, it is made easier to attract first users by giving an incentive to each first user who has evaluated the service provided by the second user.

The present disclosure can also be realized by supplying to a computer a computer program in which the functions described in the above-described embodiments are implemented, and reading out and executing the program by means of one or more processors included in the computer. Such a computer program may be provided to a computer by a non-transitory computer readable storage medium connectable to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read only memory (ROM), a random access memory (RAM), an EPROM, an EEPROM, a magnetic card, a flash memory, an optical card, or any type of medium suitable for storing electronic commands or instructions.

What is claimed is:

1. An information processing apparatus including a controller configured to perform:
   obtaining, among posts of a first user to a social networking service, a first post related to a first service that can be provided to the first user;
   transmitting, to an account of the first user via the social networking service, an inquiry about whether or not to receive the first service corresponding to the first post;
   transmitting, to an account of a second user via the social networking service, provision information for providing the first service corresponding to the first post to the first user, when there is a response to the inquiry from the account of the first user to the effect that the first user receives the first service corresponding to the first post,
   receiving information about the first service corresponding to the first post, the information being generated by the second user;
   transmitting, to the account of the first user via the social networking service, the received information about the first service corresponding to the first post;
   after transmitting the received information about the first service corresponding to the first post to the account of the first user, obtaining, among posts of the first user to the social networking service, a second post related to the first service corresponding to the first post;
   determining whether or not a keyword corresponding to an evaluation of the first service corresponding to the first post is included in the second post; and
   when the keyword corresponding to the evaluation is included in the second post, transmitting, to the account of the first user via the social networking service, information about an incentive, the information about the incentive being registered in advance in the information processing apparatus by the first user or the second user.

2. The information processing apparatus according to claim 1, wherein
   in cases where the first post is a message about a desire to deliver a taxi and indicates, as the first service, a service to deliver the taxi, the controller transmits, to the account of the first user via the social networking service, an inquiry about whether or not to receive a delivery of a taxi, and
   transmits information, as the provision information, for delivering a taxi to the first user to an account of a taxi company that is the second user followed by the first user via the social networking service, when there is a response to the inquiry from the account of the first user to the effect that the first user receives the delivery of the taxi.

3. The information processing apparatus according to claim 2, wherein
   the controller transmits, to the account of the first user via the social networking service, information about a fare or a required time when using the taxi as the information about the first service corresponding to the first post.

4. The information processing apparatus according to claim 1, wherein
   in cases where the first post is a message about a failure of a vehicle of the first user and indicates, as the first service, a service to provide advice about the failure of the vehicle, the controller transmits, to the account of the first user via the social networking service, an inquiry about whether or not to receive an advice about the failure of the vehicle, and
   transmits information, as the provision information, for providing advice to the first user to an account of a business operator that is the second user via the social networking service, when there is a response to the inquiry from the account of the first user to the effect that the first user receives the advice about the failure of the vehicle.

5. The information processing apparatus according to claim 1, wherein
   in cases where the first post includes a message and an image about a failure of a vehicle of the first user and indicates, as the first service, a service to provide advice about the failure of the vehicle, the controller transmits, to the account of the first user via the social networking service, an inquiry about whether or not to receive an advice about the failure of the vehicle, and
   transmits information, as the provision information, for providing advice to the first user to an account of a business operator that is the second user via the social networking service, when there is a response to the inquiry from the account of the first user to the effect that the first user receives the advice about the failure of the vehicle.

6. The information processing apparatus according to claim 1, wherein
- in cases where the first post includes a message and an image about a warning displayed on a display unit of a vehicle of the first user and indicates, as the first service, a service to provide advice about the warning displayed on the display unit of the vehicle, the controller transmits, to the account of the first user via the social networking service, an inquiry about whether or not to receive an advice about the warning, and
- transmits information, as the provision information, for providing advice to the first user to an account of a business operator that is the second user via the social networking service, when there is a response to the inquiry from the account of the first user to the effect that the first user receives the advice about the warning.

7. The information processing apparatus according to claim 1, wherein
- in cases where the first post is a message about a desire to use car sharing or ride sharing and indicates, as the first service, a service to deliver car sharing or ride sharing, the controller transmits, to the account of the first user via the social networking service, an inquiry about whether or not to receive a vehicle arrangement, and
- transmits information, as the provision information, for delivering a car to the first user to an account of an operating company of car sharing or ride sharing, which is the second user followed by the first user, via the social networking service, when there is a response to the inquiry from the account of the first user to the effect that the first user receives the vehicle arrangement.

8. The information processing apparatus according to claim 1, wherein
- in cases where the first post is a message about the birth of a child and indicates, as the first service, a service to sell vehicles capable of carrying the child, the controller transmits, to the account of the first user via the social networking service, an inquiry about whether or not to receive a purchase of a vehicle capable of carrying the child, and
- transmits, to an account of a business operator that is the second user via the social networking service, information, as the provision information, for allowing the first user to purchase a vehicle capable of carrying the child, when there is a response to the inquiry from the account of the first user to the effect that the first user receives the purchase of the vehicle capable of carrying the child.

9. The information processing apparatus according to claim 1, wherein
- in cases where the first post is a message about the birth of a child and indicates, as the first service, a service to sell houses, the controller transmits, to the account of the first user via the social networking service, an inquiry about whether or not to receive a purchase of a house, and
- transmits, to an account of a business operator that is the second user via the social networking service, information, as the provision information, for allowing the first user to purchase a house, when there is a response to the inquiry from the account of the first user to the effect that the first user receives the purchase of the house.

10. The information processing apparatus according to claim 1, wherein
- in cases where the first post is a message about suspension or delay of transportation and indicates, as the first service, a service to provide information about alternative transportation, the controller transmits, to the account of the first user via the social networking service, an inquiry about whether or not to receive a presentation of an alternative transportation, and
- transmits, to an account of a business operator that is the second user via the social networking service, information, as the provision information, for providing information about alternative transportation to the first user, when there is a response to the inquiry from the account of the first user to the effect that the first user receives the presentation of the alternative transportation.

11. An information processing method for causing a computer to perform:
- obtaining, among posts of a first user to a social networking service, a first post related to a first service that can be provided to the first user;
- transmitting, to an account of the first user via the social networking service, an inquiry about whether or not to receive the first service corresponding to the first post;
- transmitting, to an account of a second user via the social networking service, provision information for providing the first service corresponding to the first post to the first user, when there is a response to the inquiry from the account of the first user to the effect that the first user receives the first service corresponding to the first post,
- receiving information about the first service corresponding to the first post, the information being generated by the second user;
- transmitting, to the account of the first user via the social networking service, the received information about the first service corresponding to the first post;
- after transmitting the received information about the first service corresponding to the first post to the account of the first user, obtaining, among posts of the first user to the social networking service, a second post related to the first service corresponding to the first post;
- determining whether or not a keyword corresponding to an evaluation of the first service corresponding to the first post is included in the second post; and
- when the keyword corresponding to the evaluation is included in the second post, transmitting, to the account of the first user via the social networking service, information about an incentive, the information about the incentive being registered in advance in the computer by the first user or the second user.

12. A non-transitory storage medium storing a program therein for causing a computer to perform:
- obtaining, among posts of a first user to a social networking service, a first post related to a first service that can be provided to the first user;
- transmitting, to an account of the first user via the social networking service, an inquiry about whether or not to receive the first service corresponding to the first post;
- transmitting, to an account of a second user via the social networking service, provision information for providing the first service corresponding to the first post to the first user, when there is a response to the inquiry from the account of the first user to the effect that the first user receives the first service corresponding to the first post, receiving information about the first service corresponding to the first post, the information being generated by the second user;

transmitting, to the account of the first user via the social networking service, the received information about the first service corresponding to the first post;

after transmitting the received information about the first service corresponding to the first post to the account of the first user, obtaining, among posts of the first user to the social networking service, a second post related to the first service corresponding to the first post;

determining whether or not a keyword corresponding to an evaluation of the first service corresponding to the first post is included in the second post; and when the keyword corresponding to the evaluation is included in the second post, transmitting, to the account of the first user via the social networking service, information about an incentive, the information about the incentive being registered in advance in the information processing apparatus by the first user or the second user.

* * * * *